(12) United States Patent
Park

(10) Patent No.: US 9,072,145 B2
(45) Date of Patent: Jun. 30, 2015

(54) LIGHT-EMITTING DIODE DRIVING CIRCUIT FOR LIGHTING

(75) Inventor: Soung Hwi Park, Anyang-si (KR)

(73) Assignee: POWER CHIPS CO., LTD., Seoul (KR)

( * ) Notice: Subject to any disclaimer, the term of this patent is extended or adjusted under 35 U.S.C. 154(b) by 278 days.

(21) Appl. No.: 13/877,884

(22) PCT Filed: Mar. 7, 2011

(86) PCT No.: PCT/KR2011/001565
§ 371 (c)(1),
(2), (4) Date: Apr. 4, 2013

(87) PCT Pub. No.: WO2012/046927
PCT Pub. Date: Apr. 12, 2012

(65) Prior Publication Data
US 2013/0207557 A1    Aug. 15, 2013

(30) Foreign Application Priority Data

Oct. 6, 2010 (KR) .................... 10-2010-0097461

(51) Int. Cl.
H05B 37/00    (2006.01)
H05B 33/08    (2006.01)

(52) U.S. Cl.
CPC ........ *H05B 33/0833* (2013.01); *H05B 33/0809* (2013.01); *H05B 33/083* (2013.01); *Y02B 20/348* (2013.01)

(58) Field of Classification Search
None
See application file for complete search history.

(56) References Cited

U.S. PATENT DOCUMENTS

| 8,324,840 B2 * | 12/2012 | Shteynberg et al. ......... 315/308 |
| 2012/0098448 A1 * | 4/2012 | Kang et al. ..................... 315/201 |
| 2013/0342117 A1 * | 12/2013 | Park ............................... 315/187 |

FOREIGN PATENT DOCUMENTS

| CN | 2786904 | 6/2006 |
| CN | 201114877 | 9/2008 |
| CN | 101374380 | 2/2009 |
| CN | 201230391 | 4/2009 |
| CN | 101466181 | 6/2009 |
| CN | 101689060 | 3/2010 |
| JP | 2006-244848 | 9/2006 |
| KR | 10-2004-0080910 | 9/2004 |
| KR | 10-0754887 | 8/2007 |
| KR | 10-2008-0002852 | 1/2008 |
| KR | 10-2010-0068418 | 6/2010 |

OTHER PUBLICATIONS

International Search Report for PCT/KR2011/001565, dated Oct. 4, 2011.

* cited by examiner

*Primary Examiner* — Long Nguyen
(74) *Attorney, Agent, or Firm* — Kile Park Reed & Houtteman PLLC

(57) ABSTRACT

The present invention relates to a light-emitting diode (LED) driving circuit for lighting, which divides a specific pattern of driving data for a number of sections within one period or a half period of driving power, stores the divided data in a driving data storage device, and drives LEDs connected in series in an LED array unit using the driving data so as to drive the LEDs with high efficiency, a high power factor, and low total harmonic distortion (HTD).

11 Claims, 6 Drawing Sheets

Fig.5

| ORDER | Harmonics | | Remark |
|---|---|---|---|
| | Ratio | P² | |
| 1 | | | |
| 2 | 0.0% | 0.6 | RMS_Image |
| 3 | 4.0% | 9254.8 | 429.4 |
| 4 | 0.0% | 0.6 | |
| 5 | 6.0% | 2.787.6 | |
| 6 | 0.0% | 0.6 | |
| 7 | 7.7% | 34583.7 | |
| 8 | 0.0% | 0.6 | |
| 9 | 3.2% | 5828.3 | |
| 10 | 0.0% | 0.6 | |
| 11 | 7.1% | 28867.6 | |
| 12 | 0.0% | 0.6 | |
| 13 | 1.4% | 1143.3 | |
| 14 | 0.0% | 0.6 | |
| 15 | 1.6% | 1518.2 | |
| 16 | 0.0% | 0.6 | |
| 17 | 6.2% | 22365.9 | |
| 18 | 0.0% | 0.6 | |
| 19 | 0.5% | 128.8 | |
| 20 | 0.0% | 0.6 | |
| 21 | 2.5% | 3639.1 | |
| 22 | 0.0% | 0.6 | |
| 23 | 2.6% | 4000.0 | |
| 24 | 0.0% | 0.6 | |
| 25 | 4.6% | 12270.2 | |
| 26 | 0.0% | 0.6 | |
| 27 | 0.4% | 99.9 | |
| 28 | 0.0% | 0.6 | |
| 29 | 5.6% | 18154.5 | |
| 30 | 0.0% | 0.6 | |
| 31 | 3.3% | 6236.8 | |
| 32 | 0.0% | 0.6 | |
| 33 | 0.2% | 26.5 | |
| 34 | 0.0% | 0.6 | |
| 35 | 0.7% | 256.1 | |
| 36 | 0.0% | 0.6 | |
| 37 | 0.5% | 148.9 | |
| 38 | 0.0% | 0.6 | |
| 39 | 0.3% | 59.0 | |
| 40 | 0.0% | 0.6 | |
| 41 | 0.3% | 69.9 | |
| 42 | 0.0% | 0.6 | |
| 43 | 2.1% | 2592.7 | |
| 44 | 0.0% | 0.6 | |
| 45 | 0.3% | 66.0 | |
| 46 | 0.0% | 0.6 | |
| 47 | 3.8% | 8527.9 | |
| 48 | 0.0% | 0.6 | |
| 49 | 2.6% | 3787.4 | |
| 50 | 0.0% | 0.6 | |

Fig.6

| Results of Analysis |
|---|
| ID_rms = 19.993 [mA] |
| Apparent Power = 4.398 [W] = VAC_rms*ID_rms |
| Effective Power = 4.164 [W] = $\Sigma$(VAC*ID) |
| PF = 0.947 = Effective Power / Apparent Power |
| Diode Power = 3.539 [W] = $\Sigma$(VD*ID) |
| Power Efficiency = 0.850 = Diode Power / Effective Power |
| ID_peak = 34.0 [mA] (I_CF1.7 = 34.0) |
| CF = 1.70 = ID_peak/ID_rms |
| THD = 17.82% |

LIGHT-EMITTING DIODE DRIVING CIRCUIT FOR LIGHTING

TECHNICAL FIELD

The present invention relates to a technique for driving a lighting device including light emitting diodes (LEDs), and more particularly, to an LED driving circuit for lighting, which is capable of driving LEDs with high efficiency, a high power factor, and low total harmonic distortion (THD) using a specific pattern of data.

BACKGROUND ART

With the development of semiconductor technology, the efficiency of an LED has been significantly improved. Since the LED has a larger lifetime and smaller energy consumption than existing lighting devices such as incandescent lamps or fluorescent lamps, the LED is economical and environment-friendly. Due to such advantages, much attention has been paid to the LED as a light source to replace a back light of a traffic light or flat display (for example, LCD).

In general, when the LED is used as a lighting device, a plurality of LED modules each having a plurality of LEDs mounted therein are disposed in a specific arrangement and then installed on the ceiling or wall surface of a space so as to be used. Since the LEDs are driven by direct current at a proper voltage, each of the LED modules includes an AC/DC converter. The AC/DC converter includes a trans-coil for lowering an AC voltage. Since such a trans-coil occupies a considerably large space in the LED module, the size of products to which the trans-coil is applied is inevitably increased.

In order to solve such a problem, a power supply device called a switching mode power supply (SMPS) has been recently used. However, a recent LED lighting device includes a plurality of LEDs connected in series without the SMPS, and is driven in such a manner that each of the LEDs lowers the voltage with respect to power.

However, the conventional LED lighting device could not properly control the drive of the LEDs in response to driving power which is varied in accordance with time. Accordingly, the efficiency and power factor may be reduced, and THD may be increased. Furthermore, when fluctuation occurs in input driving power, brightness may be varied.

DISCLOSURE

Technical Problem

Accordingly, the present invention has been made in an effort to solve the problems occurring in the related art, and an object of the present invention is to provide a light emitting diode (LED) driving circuit for lighting, which divides a specific pattern of driving data for a number of sections within one period or a half period of driving power, stores the divided diving data in a driving data storage device, and drives a plurality of LEDs connected in series in an LED array unit with high efficiency, a high power factor, and low total harmonic distortion (THD) using the driving data.

Technical Solution

In order to achieve the above object, according to one aspect of the present invention, there is provided a light-emitting diode (LED) driving circuit for lighting, including: a bridge diode rectification unit configured to full-wave rectify AC power and supply pulsating-current driving power to an LED array unit including two or more LEDs connected in series; a synchronizing signal and clock generating unit configured to detect the period of the pulsating-current driving power, generate a synchronizing signal based on the detected period, and generate a clock having a frequency several times larger than input power using the generated synchronizing signal; a driving data storage device in which driving data of a pattern for driving the LEDs in the LED array unit with high frequency, a high power factor, and low total harmonic distortion (THD) are divided and stored for a number of sections within one period or a half period of the driving power; a drive control unit configured to generate address signals corresponding to clocks outputted from the synchronizing signal and clock generating unit and sequentially read the driving data for the respective sections which are stored in the driving data storage device; a D/A converter configured to convert digital driving data outputted from the drive control unit into analog signals; and a constant current driving device unit configured including a plurality of constant current driving devices connected to taps of the LEDs connected in series in the LED array unit so as to selectively drive the LEDs according to an output signal of the D/A converter, and configured to drive a corresponding LED among the LEDs connected in series to a corresponding current value during a corresponding period, through the plurality of constant current driving devices.

Advantageous Effects

According to the embodiment of the present invention, the light emitting diode (LED) driving circuit for lighting may divide a specific pattern of driving data for a number of sections within one period or a half period of driving power, store the divided diving data in a driving data storage device, and drive a plurality of LEDs connected in series in an LED array unit with high efficiency, a high power factor, and low total harmonic distortion (THD) using the driving data.

Furthermore, although an input power voltage is varied, a current is controlled to prevent a current flowing in the LEDs connected in series from being varied. Accordingly, flickering does not occur.

BRIEF DESCRIPTION OF THE DRAWINGS

The above objects, and other features and advantages of the present invention will become more apparent after a reading of the following detailed description taken in conjunction with the drawings, in which:

FIG. 5 is a table showing the harmonics illustrated in FIG. 4;

FIG. 6 is a performance evaluation table of the LED driving circuit according to the embodiment of the present invention.

BEST MODE FOR THE INVENTION

Figure 1:
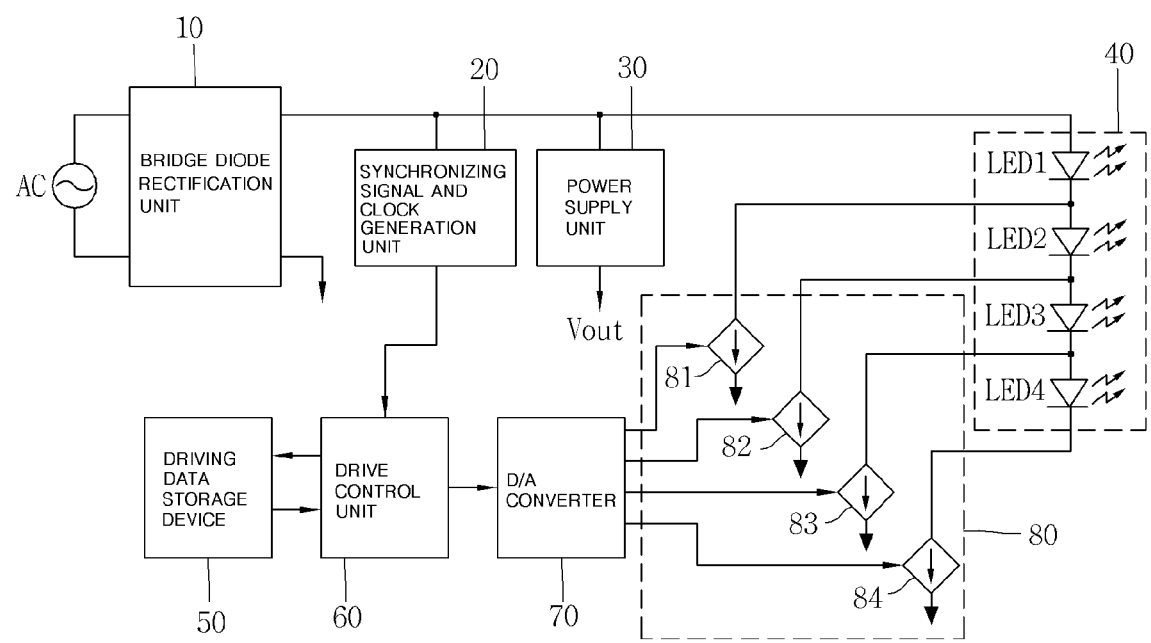
FIG. 1 is a block diagram of an LED driving circuit for lighting according to an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a block diagram of an LED driving circuit for lighting according to an embodiment of the present invention. Referring to FIG. 1, the LED driving circuit includes a bridge diode rectification unit 10, a synchronizing signal and clock generating unit 20, a power supply unit 30, an LED array unit 40, a driving data storage device 50, a drive control unit 60, a D/A converter 70, and a constant current driving device unit 80.

Referring to FIG. 1, the bridge diode rectification unit 10 is configured to full-wave rectify a common AC input and supply pulsating-current driving power to the LED array unit 40.

The synchronizing signal and clock generating unit 20 is configured to detect the period of power inputted from the bridge diode rectification unit 10, generate a synchronizing signal based on the detected period, and generate a clock having a frequency several to several hundred times larger than the input power using the synchronizing signal. Furthermore, the synchronizing signal and clock generation unit 20 counts a clock oscillating during one period of the input power, checks whether or not the counting value falls within an error range of a preset oscillation frequency, and controls the oscillation frequency to fall within the error range when the counting value does not fall within the error range of the preset oscillation frequency.

The power supply unit 30 is configured to smooth the pulsating-current voltage outputted from the bridge diode rectification unit 10, and convert the smoothed voltage into voltages corresponding to levels required by the respective units of the LED driving circuit, for example, VCC and VDD.

The LED array unit 40 includes two or more LEDs LED1 to LED4 connected in series, and cathodes of the LEDs LED1 to LDE4 are connected to constant current driving devices 81 to 84 through taps, respectively.

Figure 2:
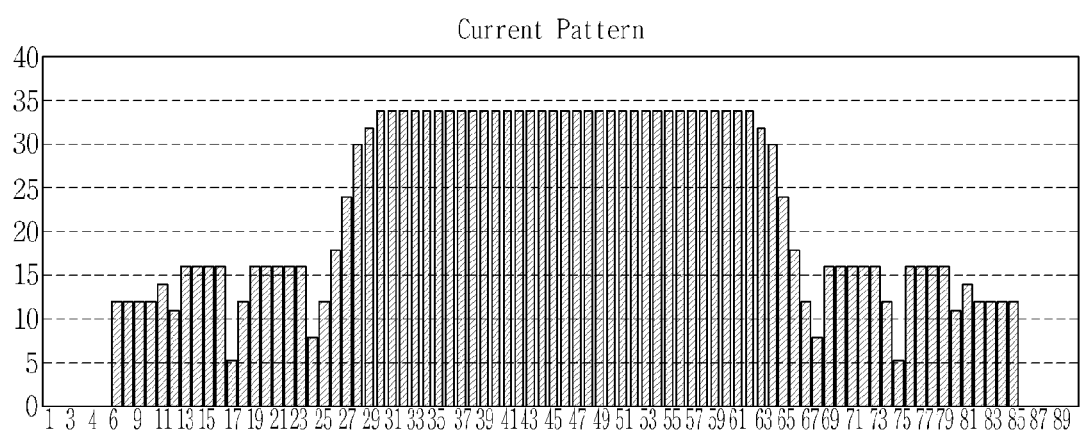
FIG. 2 is a diagram illustrating current patterns of the LEDs according to the embodiment of the present invention.

The driving data storage device 50 is configured to previously store a specific pattern of driving data for driving the LEDs LDE1 to LDE4 of the LED array unit 40 to exhibit high efficiency, a high power factor, and low THD. The driving data stored in the driving data storage device 50 include select information for dividing one period or a half period of the driving power into predetermined sections, for example, 90 sections as illustrated in FIG. 2 and selecting the constant current driving devices 81 to 84 in each section, a current value which the selected constant current driving device is to pass during the corresponding section, a section width of each section, the number of LEDs LED1 to LED4, the voltage and frequency of input driving power, electric energy to be used and the like. Furthermore, the driving data storage device 50 may store optimal driving data for each product in response to the characteristics of the LED, the number of connected LEDs, the voltage and frequency of input power, and efficiency, power factor, and THD properties corresponding to power to be used and various regulations. The driving data storage device 50 may simultaneously store driving data of a plurality of channels.

The drive control unit 60 is configured to generate an address signal in response to a clock outputted from the synchronizing signal and clock generating unit 20, for example, whenever 16 clocks are inputted, and supply the generated address signal to the driving data storage device 50. Accordingly, the drive control unit 60 sequentially receives a current value and a section width of a corresponding section and the select information, which are stored in the corresponding address, from the driving data storage device 50 and then outputs the received information.

The D/A converter 70 is configured to convert the select information outputted from the drive control unit 60 into an analog signal, and selects a corresponding constant current driving device among the constant current driving devices 81 to 84 of the constant current driving device unit 80 using the converted select signal. Furthermore, the D/A converter 70 converts the current value and section width of the corresponding section, outputted from the drive control unit 60, into an analog signal and outputs the analog signal to the selected driving device.

The constant current driving device unit 80 includes the plurality of constant current driving devices 81 to 84 connected to the taps (cathodes) of the LEDs LED1 to LED4, respectively, and connected to corresponding output terminals of the D/A converter 70.

The process in which the constant current driving devices 81 to 84 are driven by the output signal of the D/A converter 70 will be described in more detail with reference to FIG. 2.

When one period or a half period of driving power is divided into small sections (for example, 90 sections) as illustrated in FIG. 2, the above-described select information, current value, and section width for each period are read from the driving data storage device 50 by the drive control unit 60, and then outputted through the D/A converter 70.

When the constant current driving device 81 is selected by the select signal (select information) outputted from the D/A converter 70 in an arbitrary section, the LED LED1 is lit with a corresponding current value and section width in the corresponding section.

When the constant current driving device 82 is selected by the select signal (select information) outputted from the D/A converter 70 during an arbitrary section, the LEDs LED1 and LED2 are lit with a corresponding current value and section width in the corresponding section.

When the constant current driving device 83 is selected by the select signal (select information) outputted from the D/A converter 70 during an arbitrary section, the LEDs LED1, LED2, and LED3 are lit with a corresponding current value and section width in the corresponding section.

When the constant current driving device 84 is selected by the select signal (select information) outputted from the D/A converter 70 during an arbitrary section, the LEDs LED1, LED2, LED3, and LED4 are lit with a corresponding current and section width in the corresponding section.

Referring to FIG. 2, during first to 29th sections (first group) among the 90 sections, the constant current driving devices 81, 82, and 83 are sequentially selected on the whole. At this time, the corresponding current value is outputted by the corresponding section width. Accordingly, one LED LED1, two LEDs LED1 and LED2, or three LEDs LED1, LED2, and LED3 is/are lit at a brightness corresponding to the corresponding current value during the corresponding section width.

Then, during 30th to 62nd sections (second group), only the last constant current driving device 84 is selected and lit at a brightness corresponding to the corresponding current value during the corresponding section width. Therefore, the maximum brightness is achieved.

Then, during 63rd to 90 sections (third group), the constant current driving devices 83, 82, and 81 are sequentially selected on the whole. At this time, the corresponding current value is outputted during the corresponding section width. Accordingly, three LEDs LED1, LED2, and LED3, two LEDs LED1 and LED2, or one LED LED1 are/is lit at brightness corresponding to the corresponding current value during the corresponding section width.

Figure 3:
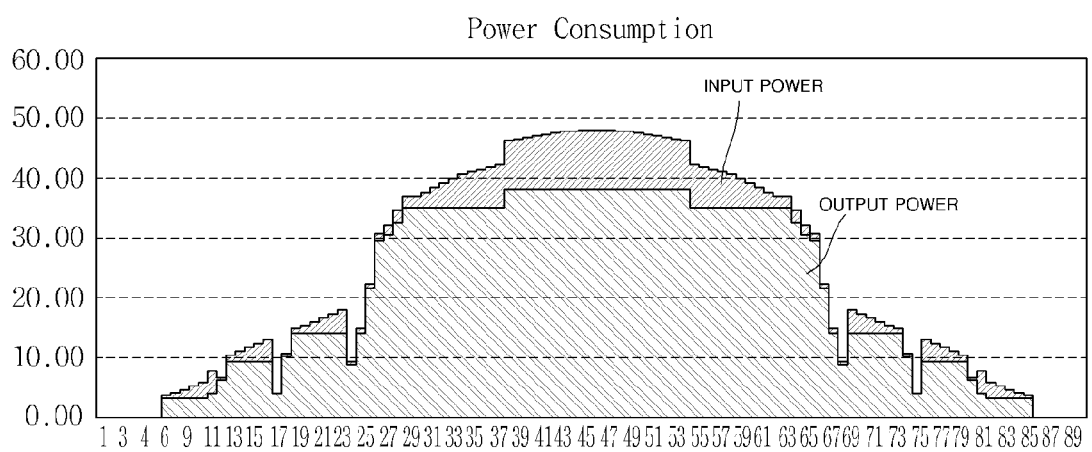
FIG. 3 is a waveform diagram comparatively illustrating input power and output power in the LED driving circuit according to the embodiment of the present invention.

Since the plurality of LEDs LED1 to LED4 arranged in series in the LED array unit 40 are lit through the above-described series of processes, input power and output power do not have a large difference from each other across the entire sections as illustrated in FIG. 3.

Figure 4:
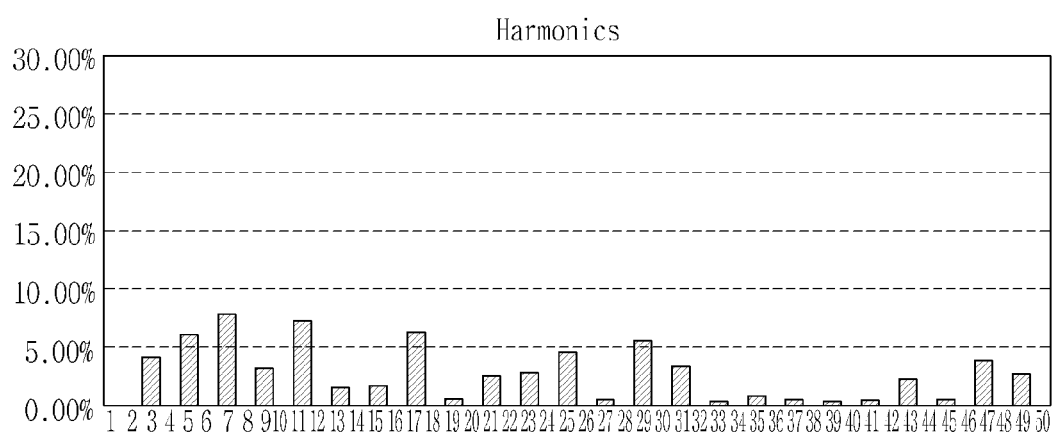
FIG. 4 is a waveform diagram illustrating harmonics occurring in input power when the LED driving circuit according to the embodiment of the present invention is used.

When the LEDs LED1 to LED4 are driven by the above-described driving data, it can be seen that THD at input power is 17% or less as illustrated in FIG. 4. For reference, although THD values at the respective orders are 5% or less, the THD value is indicated by 17.82% as shown in a performance table of FIG. 6, because the THD values are obtained through RMS. A target value is 20% or less which corresponds to a half or less of the THD value in the conventional technique.

FIG. 5 is a table showing the harmonics illustrated in FIG. 4.

FIG. 6 is a table showing performance evaluation results of the LED driving device, when the LEDs LDE1 to LED4 are driven by the above-described driving data.

When the present invention is used as shown in FIGS. 3 to 6, it can be seen that the LEDs LED1 to LED4 are driven to exhibit high efficiency, a high power factor, and low THD.

Figure 7:
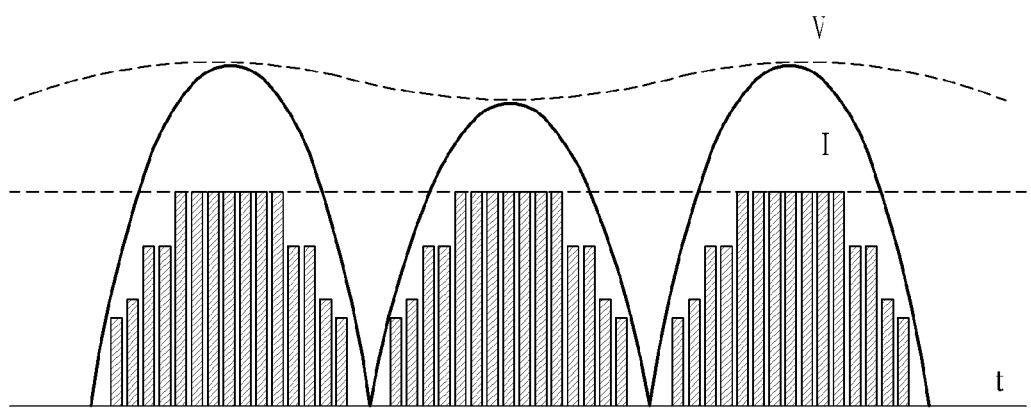
FIG. 7 is a waveform diagram illustrating that a current flowing in LEDs is not changed in response to a variation of power voltage in the LED driving circuit according to the embodiment of the present invention.

When the present invention is used, the current flowing in the LEDs LED1 to LED4 is not varied even though an input power voltage is varied as illustrated in FIG. 7. Therefore, flickering does not occur.

FIG. 1 illustrates that one LED is connected to one constant current driving device. However, the present invention is not limited thereto, but a plurality of LEDs connected in series may be connected to one constant current driving device to control driving (lighting).

Although a preferred embodiment of the present invention has been described for illustrative purposes, those skilled in the art will appreciate that various modifications, additions and substitutions are possible, without departing from the scope and the spirit of the invention as disclosed in the accompanying claims.

The invention claimed is:

1. A light-emitting diode (LED) driving circuit for lighting, comprising:
   a bridge diode rectification unit configured to full-wave rectify AC power and supply pulsating-current driving power to an LED array unit including two or more LEDs connected in series;
   a synchronizing signal and clock generating unit configured to detect the period of the pulsating-current driving power, generate a synchronizing signal based on the detected period, and generate a clock having a frequency several times larger than input power using the generated synchronizing signal;
   a driving data storage device in which driving data of a pattern for driving the LEDs in the LED array unit with high frequency, a high power factor, and low total harmonic distortion (THD) are divided and stored for a number of sections within one period or a half period of the driving power;
   a drive control unit configured to generate address signals corresponding to clocks outputted from the synchronizing signal and clock generating unit and sequentially read the driving data for the respective sections which are stored in the driving data storage device;
   a D/A converter configured to convert digital driving data outputted from the drive control unit into analog signals; and
   a constant current driving device unit configured comprising a plurality of constant current driving devices connected to taps of the LEDs connected in series in the LED array unit so as to selectively drive the LEDs according to an output signal of the D/A converter, and configured to drive a corresponding LED among the LEDs connected in series to a corresponding current value during a corresponding period, through the plurality of constant current driving devices.

2. The LED driving circuit of claim 1, wherein the AC power comprises common AC power.

3. The LED driving circuit of claim 1, wherein the LED array unit comprises two or more LEDs connected in series, and one or more LEDs are connected to each of the constant current driving devices through a tap.

4. The LED driving circuit of claim 3, wherein the tap is connected to a cathode of a corresponding LED.

5. The LED driving circuit of claim 1, wherein the synchronizing signal and clock generating unit controls an oscillation frequency such that a clock oscillating during one period of the AC power falls within an error range, when the clock deviates from the error range.

6. The LED driving circuit of claim 1, wherein the driving data comprises one or more of select information for dividing one period or a half period of the driving power into predetermined sections and selecting a constant current driving device in each section, a current value which the selected constant current driving device is to pass during the corresponding section, a section width of each section, the number of LEDs, the voltage and frequency of input driving power, and electric energy to be used.

7. The LED driving circuit of claim 1, wherein the driving data storage device stores optimal driving data for each product in response to characteristics of the LEDs, the number of connected LEDs, the voltage and frequency of input driving power, and efficiency, power factor, and THD properties corresponding to electric energy to be used and a plurality of regulations.

8. The LED driving circuit of claim 1, wherein the driving data storage device simultaneously stores driving data of a plurality of channels.

9. The LED driving circuit of claim 1, wherein the driving data comprises a current value that does not vary a current flowing in the LEDs regardless of variation in an input power voltage, such that flickering does not occur.

10. The LED driving circuit of claim 1, wherein the constant current driving device unit sequentially drives first to third constant current driving devices in a first group such that a corresponding current value is outputted by a corresponding section width, continuously drives a fourth constant current driving device in a second group such that all of the LEDs are lit at a brightness corresponding to a corresponding current value during a corresponding section width, and sequentially drives the third to first constant current driving devices in a third group such that a corresponding current value is outputted by a corresponding section width.

11. The LED driving circuit of claim 1, further comprising a power supply unit configured to smooth the pulsating-current voltage outputted from the bridge diode rectification unit and convert the smoothed voltage into voltages corresponding to levels required by the respective units of the LED driving circuit.

* * * * *